(12) United States Patent
Schneider et al.

(10) Patent No.: US 6,793,238 B2
(45) Date of Patent: Sep. 21, 2004

(54) AIRBAG COVERS FOR MULTI-AXIS DEPLOYMENT

(75) Inventors: David W. Schneider, Waterford, MI (US); Steven R. Fredin, Ortonville, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/267,259

(22) Filed: Oct. 8, 2002

(65) Prior Publication Data

US 2003/0178819 A1 Sep. 25, 2003

Related U.S. Application Data

(63) Continuation-in-part of application No. 10/104,236, filed on Mar. 20, 2002.

(51) Int. Cl.[7] .............................................. B60R 21/20
(52) U.S. Cl. ................................ 280/728.3; 280/728.2
(58) Field of Search ............................. 280/728.3, 731, 280/728.2; B60R 21/20

(56) References Cited

U.S. PATENT DOCUMENTS

| | | | |
|---|---|---|---|
| 3,819,205 A | 6/1974 | Dunford et al. | 280/150 |
| 3,907,330 A | 9/1975 | Kondo et al. | 280/150 |
| 4,148,503 A | 4/1979 | Shiratori et al. | 280/731 |
| 4,325,568 A | 4/1982 | Clark et al. | 280/731 |
| 4,334,699 A | 6/1982 | Patzelt et al. | 280/731 |
| 4,785,144 A | 11/1988 | Fosnaugh et al. | 200/61.55 |
| 4,903,986 A | 2/1990 | Cok et al. | 280/743 |
| 5,002,307 A | 3/1991 | Heidorn | 280/731 |
| 5,013,064 A | 5/1991 | Miller et al. | 280/730 |
| 5,135,255 A | 8/1992 | Henseler et al. | 280/743 |
| 5,174,602 A | 12/1992 | Nakayama et al. | 280/743 |
| 5,320,380 A * | 6/1994 | Hamada et al. | 280/728.3 |
| 5,893,581 A * | 4/1999 | Niederman | 280/731 |
| 5,957,484 A | 9/1999 | Levine et al. | 280/728.3 |
| 6,540,252 B2 * | 4/2003 | Mu et al. | 280/728.3 |
| 2002/0005631 A1 * | 1/2002 | Varcus et al. | 280/728.3 |
| 2002/0113418 A1 | 8/2002 | Endo et al. | |
| 2002/0175501 A1 * | 11/2002 | Jenkins et al. | 280/728.3 |
| 2003/0178818 A1 | 9/2003 | Schneider et al. | |

FOREIGN PATENT DOCUMENTS

JP 04110251 A * 4/1992

* cited by examiner

Primary Examiner—Ruth Ilan
(74) Attorney, Agent, or Firm—Sally J. Brown

(57) ABSTRACT

Enhanced airbag covers are disclosed. Each of the covers permits deployment of a compacted airbag cushion along multiple axes, thereby decreasing the momentum of the vehicle occupant relative to the airbag, and enhancing the ability of the cushion to protect vehicle occupants who are out of their nominal positions. Covers may include a plurality of frontal portions separated by a frontal seam or seams that tear open to permit emergence of the cushion between the frontal portions. In some implementations, each cover has a peripheral skirt and/or a junction between the frontal portions and peripheral skirt that opens to permit emergence of the folded cushion along additional axes. The peripheral skirt and/or junction may open consistently, regardless of whether the frontal portions have separated.

22 Claims, 7 Drawing Sheets

AIRBAG COVERS FOR MULTI-AXIS DEPLOYMENT

RELATED APPLICATIONS

This application is a continuation-in-part of patent application Ser. No. 10/104,236 filed on Mar. 20, 2002 and entitled Airbag Cover with Multi-Axis Deployment, which is incorporated herein by this reference.

BACKGROUND OF THE INVENTION

1. Field of the Invention

The present invention relates to systems and methods for protecting vehicle occupants from injury. More specifically, the present invention relates to covers that permit multi-axis deployment of inflatable cushions.

2. Technical Background

The inclusion of inflatable safety restraint devices, or airbags, is now a legal requirement for many new vehicles. Airbags are typically installed in the steering wheel and in the dashboard on the passenger side of a car. Additionally, airbags may be installed to inflate beside the passenger to provide side impact protection, in front of the knees to protect the knees from impact, or at other strategic locations.

In the event of an accident, an accelerometer within the vehicle measures the abnormal deceleration and triggers the ignition of an explosive charge. Expanding gases from the charge fill the airbags, which immediately inflate to protect the driver and/or passengers from impact against the interior surfaces of the vehicle. During normal vehicle operation, airbags are typically stowed behind covers to protect them from tampering and provide a more attractive interior facade for the vehicle.

Unfortunately, vehicle occupants may move considerably from optimal impact positions. For example, a passenger may be adjusting the radio or air conditioning settings, tending to a child in the rear seat, reclining in the seat, or otherwise moving in a manner that positions part of their body outside the protection zone of a conventional airbag. Hence, when impact occurs, a part of the person's body may strike the vehicle interior outside the perimeter of the airbag, or the person may even be injured in some manner by the inflating airbag. Also, occupants that are small, such as children, may move outside the protected area of a conventional airbag in a collision.

This shortcoming is caused, at least in part, by the fact that many known airbags inflate only in a single direction, which is often toward the person. For example, front impact airbags typically inflate primarily in a rearward direction, directly toward the driver or passenger. Hence, interior surfaces of the vehicle that surround the airbag when it is in a stowed position may not be sufficiently covered by the airbag by the time the person's body moves toward them. Thus, such surfaces are exposed to receive impact with parts of the person's body that are not aligned with the inflating cushion.

Furthermore, the momentum of the deploying cushion can also be a source of injury to vehicle occupants. When the majority of the gas produced is directed toward the occupant, the mass of the gas will create significant momentum in the deploying cushion. The momentum of the bag toward the person has an additive effect on the momentum of the person toward the bag, potentially making the impact more dramatic.

The deployment of known cushions or curtains is often determined, at least in part, by the configuration of the covers that contain them. Many known covers have seams arranged to permit emergence of the cushion in essentially a single direction. Lateral or transverse deployment of the cushion is restricted by walls of the cover.

Accordingly, a need exists for airbag covers that permit deployment of a folded cushion along multiple directions. Such covers are needed for a wide variety of airbag types, including driver's side airbags, passenger's side airbags, side impact airbags or "inflatable curtains," and knee airbags. Multi-axis deployment should preferably occur in normal operation of the cover, and not simply in the event that deployment toward the person is obstructed. Furthermore, such a cover should preferably be easily manufactured and installed in a vehicle.

SUMMARY OF THE INVENTION

The apparatus of the present invention has been developed in response to the present state of the art, and in particular, in response to problems and needs in the art that have not yet been fully solved by currently available airbag systems. Thus, it is an overall objective of the present invention to provide airbag covers that permit consistent multi-axis deployment. These covers provide enhanced protection for vehicle occupants that are outside their nominal positions when impact occurs without unduly adding to the momentum of the person's impact with the cushion.

In a first embodiment of the present invention, the cover has a generally pentagonal shape. However, the cover could be formed in other shapes such as an elongated rectangle or a rounded disk. A folded cushion is disposed within the cover.

The cover has a frontal direction generally directed toward a protected occupant of a vehicle in which the cover is placed. The cover also includes one or more lateral directions that are generally perpendicular to the frontal direction. The cover further includes semi-lateral directions that are generally directed between the frontal direction and the lateral directions.

The cover includes an attachment portion designed to be attached to the interior of the vehicle or housing, and a deployment portion that opens to permit emergence of the folded cushion. The deployment portion includes a frontal region and a peripheral skirt. The frontal region is divided into a plurality of frontal portions by frontal frangible seams. In response to expansion of the cushion, the frontal frangible seams break to permit the frontal portions to separate from each other so that the cushion can deploy in a frontal direction.

In this embodiment, the frontal frangible seams are formed in a T-shaped configuration to define a first, second, and third frontal portion. The first frontal portion has a generally rectangular in shape, while the second and third portions have a generally trapezoidal shape. The T-shaped seam configuration can be oriented in various directions and positioned at various locations on the frontal region. Alternatively, the frontal seams may be formed in other configurations that define three or more frontal portions, such as a Y-shaped configuration.

The deployment portion also includes a junction between the frontal region and the peripheral skirt. The frontal region and the peripheral skirt meet at approximately a right angle. However, the junction can include rounded or angled transitions from the frontal region to the peripheral skirt. The junction is comprised of junction seams, hinged junctions, and/or fixed junctions. The junction seams break in response to expansion of the cushion to permit the frontal portion to separate from the peripheral skirt. Separation of the frontal portion from the peripheral skirt permits the cushion to emerge in one or more semi-lateral directions. The hinged junctions allow an attached frontal portion to rotate with respect to the peripheral skirt. The fixed junctions maintain a generally fixed relationship between an attached frontal portion and the peripheral skirt during expansion of the cushion. As will be understood by those skilled in the art, the position and size of the junction seams, hinged junctions, and fixed junctions may be varied within the scope of this invention.

In certain implementations of the cover, the peripheral skirt is divided into a plurality of skirt portions by skirt seams. The skirt seams break in response to expansion of the cushion to permit the skirt portions to separate from each other. Separation of the skirt portions from each other permits the cushion to emerge from the cover in one or more lateral directions. Also, skirt hinges permit rotation of the skirt portions relative to adjacent parts of the peripheral skirt. The position and size of the skirt hinges and seams may be varied within the scope of this invention.

The cover includes a boundary between the attachment portion and the peripheral skirt. The boundary is comprised of fixed boundaries, boundary seams, and/or hinged boundaries. A fixed boundary maintains a generally fixed relationship between the attachment portion and an attached part of the peripheral skirt during expansion of the cushion. The boundary seams break in response to expansion of the cushion to permit separation of the attachment portion from the peripheral skirt so that the cushion can deploy in a lateral direction. The hinged boundaries allow portions of the peripheral skirt to rotate with respect to the attachment portion during expansion of the cushion. By varying the position and size of the fixed boundaries, boundary seams, and/or hinged boundaries the first embodiment may be made in a number of different ways.

A second embodiment of the cover has a generally square or rectangular shape. As in the first embodiment, the frontal frangible seams are formed in a T-shaped configuration to define three frontal portions. Each of the frontal portions is generally square or rectangular in shape. The frontal frangible seams break to enable emergence of the cushion in a frontal direction. As in the first embodiment, the T-shaped seam configuration can be oriented in various directions and positioned at various locations on a frontal region within the scope of this invention.

As in the first embodiment, junction seams may be positioned at various locations to enable deployment of a covered cushion in one or more semi-lateral directions. Also, the position and size of skirt seams and boundary seams can be varied to provide for deployment of the cushion in one or more lateral directions.

A third embodiment of the cover has a generally square or rectangular shape. Unlike previous embodiments, the frontal frangible seams are formed in an I-shaped configuration to define four frontal portions. The frontal frangible seams break to enable emergence of the cushion in a frontal direction. Each of the frontal portions is generally rectangular or square in shape. The I-shaped seam configuration may be oriented in various directions on the frontal region. Alternatively, the frontal seams can be formed in other configurations that define four or more frontal portions. As in the first and second embodiments, the junction seams, skirt seams, and/or boundary seams can be positioned in various locations to enable deployment of the cushion in one or more semi-lateral and/or lateral directions.

In view of the foregoing, through the use of the covers of the present invention, vehicle occupants may be more fully protected against injury. Occupants who are out of their nominal positions may obtain greater protection from cushions that inflate laterally and transversely as well as toward them. Additionally, multi-axis inflation may relieve a portion of the momentum imparted to the person by the airbag, thereby decreasing the possibility of injury due to impact with the airbag cushion.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1–12. The members of the present invention, as generally described and illustrated in the Figures, can be implemented in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

Figure 1:
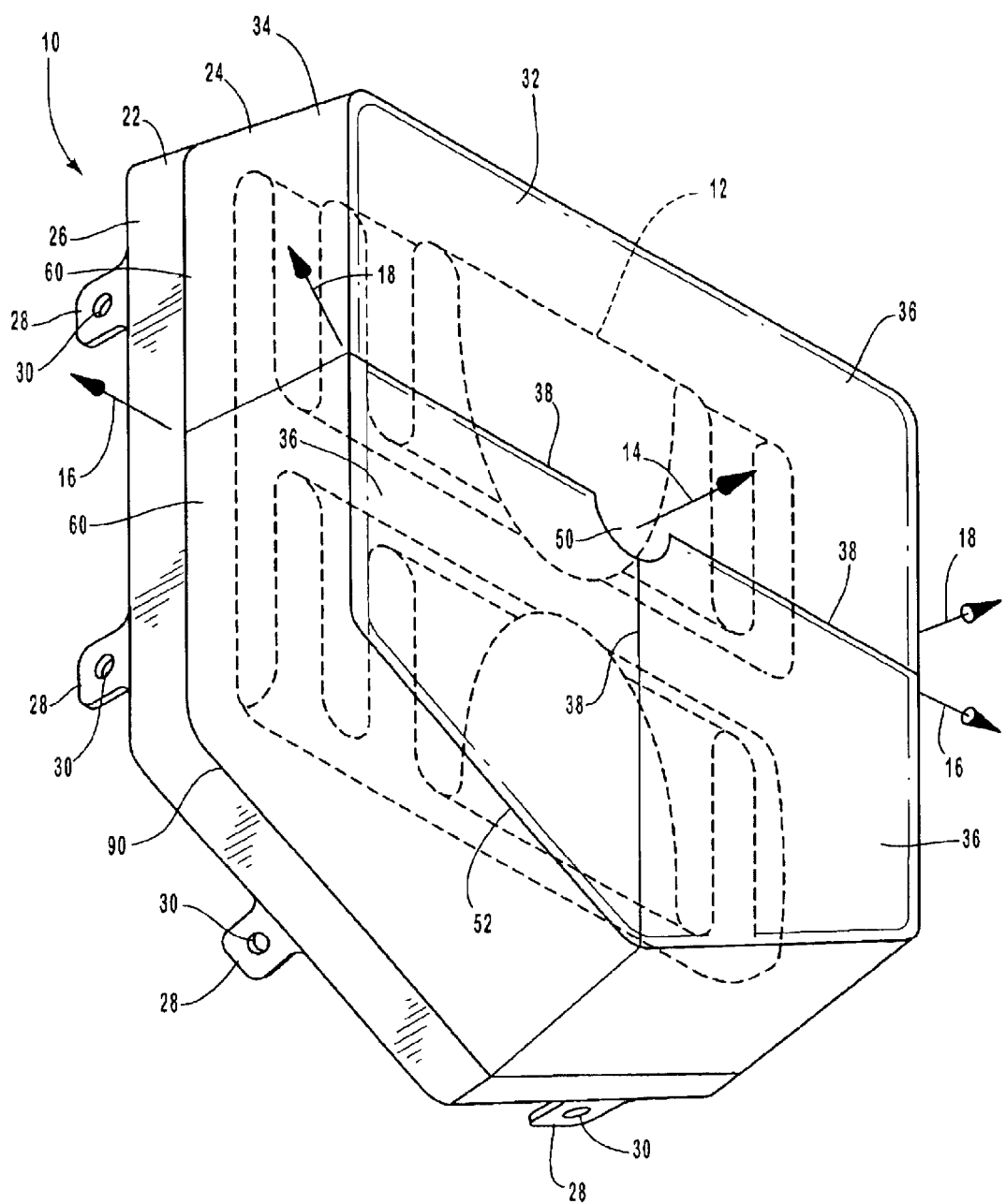
FIG. 1 is a perspective view of a first embodiment of an airbag cover in a stowed configuration with a folded cushion disposed within the cover.

Referring to FIG. 1, a perspective view of a first embodiment of an airbag cover 10 in a stowed configuration is shown. As illustrated, the airbag cover 10 has a generally pentagonal shape. The cover 10 may be used, for example, for a front impact airbag designed to protect a head and torso of an occupant of a vehicle, such as a driver's side airbag or a passenger's side airbag. Alternatively, the cover 10 can be used for an airbag designed to protect a different part of the body of an occupant, such as a knee airbag or inflatable curtain. As such, the cover 10 may be embodied in a number of different shapes. For instance, the cover 10 could be formed in the shape of an elongated rectangle or a rounded disk.

A folded cushion 12 is shown in phantom, disposed within the cover 10. The folded cushion 12 can be folded in a systematic or arbitrary manner. An inflator (not shown) is coupled to the folded cushion 12 to expel inflation gases into the folded cushion 12 to induce expansion of the cushion 12 in response to a collision. Expansion of the cushion 12 forces the cover 10 to open along frangible seams, which will be described below.

The cover 10 has a frontal direction 14 generally directed toward a protected occupant of a vehicle in which the cover 10 is placed in a vehicle (not shown). The cover 10 also has one or more lateral directions 16 that are generally perpendicular to the frontal direction 14. The cover 10 includes semi-lateral directions 18 that are generally directed between the frontal direction 14 and the lateral directions 16.

The cover 10 includes a vehicle attachment portion 22 designed to be attached to the interior of the vehicle, and a deployment portion 24 that opens to permit emergence of the folded cushion 12. The vehicle attachment portion 22 has a rim 26 disposed around the perimeter of the cover 10. A plurality of tabs 28 are positioned around the rim 26. The tabs 28 have holes 30 or other features designed to be affixed to suitable receiving features within the vehicle. If desired, the rim 26 can be disposed within a socket sized slightly larger than the cover 10, and the tabs 28 can then be attached to the interior of the socket through the use of mechanical fasteners such as bolts, nuts, clamps, clips, and the like.

The deployment portion 24 includes a frontal region 32 and a peripheral skirt 34. The frontal region 32 is generally in the shape of a pentagon. The frontal region 32 generally faces a protected occupant of a vehicle when the cover 10 is disposed within a vehicle and, thus, is generally perpendicular to the frontal direction 14. The frontal region 32 is divided into a plurality of frontal portions 36 by frontal frangible seams 38. The frontal frangible seams 38 may be contiguous with each other. In response to expansion of the cushion 12, the frontal frangible seams 38 break to permit the frontal portions 36 to separate from each other. The frontal frangible seams 38 are formed in a T-shaped configuration. The T-shaped seam configuration can be oriented in various directions on the frontal region 32. Alternatively, the frontal seams 36 may be formed in other configurations that define three or more frontal portions 36, such as a Y-shape configuration.

The frontal region 32 optionally includes a cut out portion 50. The cut out portion 50 enables placement of an emblem or other styling on approximately the center of the cover 10.

The deployment portion 24 also includes a junction 52 between the frontal region 32 and a peripheral skirt 34. As illustrated, the frontal region 32 and the peripheral skirt 34 meet at approximately a right angle. However, the junction 52 may include rounded or angled transitions from the frontal region 32 to the peripheral skirt 34. The junction 52 may be comprised of junction seams, hinged junctions, and/or fixed junctions. The junction seams break in response to expansion of the cushion 12 to permit the frontal portion 36 to separate from the peripheral skirt 34. Separation of the frontal portion 36 from the peripheral skirt 34 permits the cushion 12 to emerge in one or more semi-lateral directions 18. The hinged junctions allow an attached frontal portion 36 to rotate with respect to the peripheral skirt 34. The fixed junctions maintain a generally fixed relationship between an attached frontal portion 36 and the peripheral skirt 34 during expansion of the cushion 12. The junction 52 will be discussed and illustrated further in connection with FIGS. 2–4.

As stated, the deployment portion 24 of the cover 10 also includes a peripheral skirt 34. The peripheral skirt 34 is attached to the perimeter of the frontal region 32 and extends between the frontal region 32 and the attachment portion 22. The peripheral skirt 34 is generally perpendicular to the frontal region 32. Alternatively, the peripheral skirt 34 can be disposed at a different angle with respect to the frontal region 32. For instance, the peripheral skirt 34 may be disposed at an angle such that the peripheral skirt 34 becomes wider as it nears the attachment portion 24.

In certain implementations, the peripheral skirt 34 is divided into a plurality of skirt portions 60 by skirt seams 62. The skirt seams 62 break in response to expansion of the cushion 12 to permit the skirt portions 60 to separate from each other. Separation of the skirt portions 60 permits the cushion 12 to emerge from the cover 10 in one or more lateral directions 16.

The cover 10 also includes a boundary 90 between the attachment portion 22 and the peripheral skirt 34. The boundary 90 may be comprised of fixed boundaries, boundary seams, and/or hinged boundaries. A fixed boundary maintains a generally fixed relationship between the attachment portion 22 and the peripheral skirt 34 during expansion of the cushion 12. The boundary seams break in response to expansion of the cushion 12 to permit the attachment portion 22 to separate from the peripheral skirt 34 to permit deployment of the cushion 12 in a lateral direction 16. The hinged boundaries allow the peripheral skirt 34 to rotate with respect to the attachment portion 22 during expansion of the cushion 12.

The first embodiment of the cover 10 may be implemented in a number of different ways. For instance, different configurations may be created by altering the length and position of junction seams, hinged junctions, or fixed junctions in the cover 10. Also, fixed boundaries, boundary seams, hinged boundaries, and skirt seams 62 may also be varied. The relative tear strength of the frontal frangible seams 38, skirt seams 62, and/or junction seams may be modified to provide for deployment of the cushion 12 in frontal, lateral, and/or semi-lateral directions 14, 16, 18. Specific, non-exhaustive implementations of the first embodiment are illustrated below in connection with FIGS. 2–4.

Figure 2:
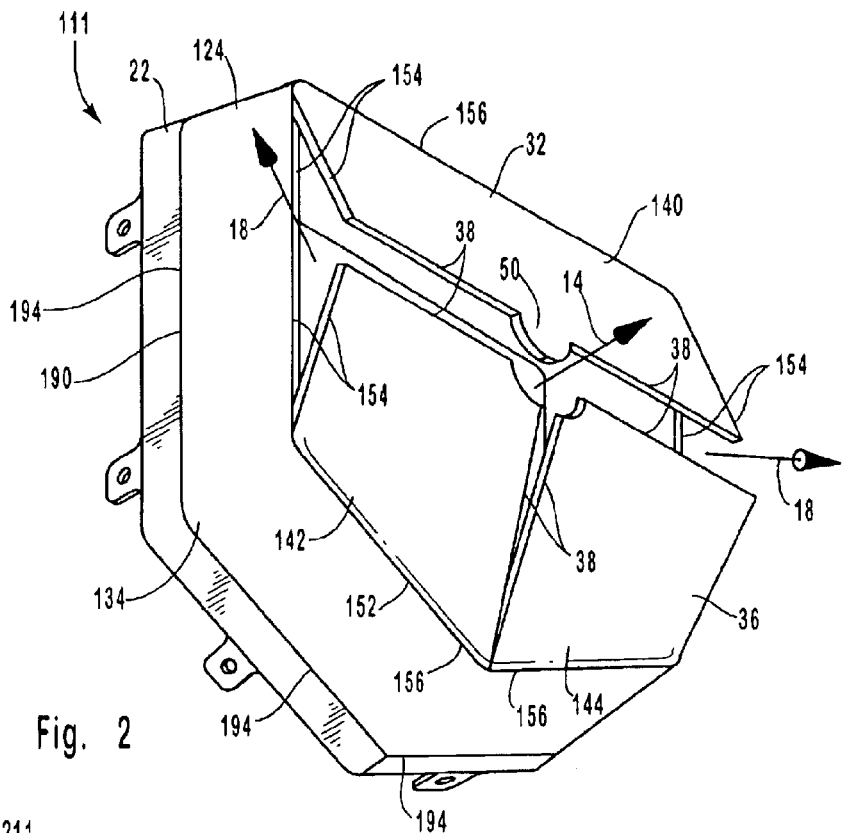
FIG. 2 is a perspective view of a first implementation of the first embodiment of the airbag cover in a partially deployed position.

With reference to FIG. 2, a perspective view of a first implementation 111 of the first embodiment of the airbag cover 10 in a partially deployed position is illustrated. The cushion 12 is omitted from FIG. 2 for clarity.

This implementation 111 of the cover 10 includes an attachment portion 22 and a deployment portion 124. The deployment portion 124 of the first implementation 111 opens to permit emergence of the cushion 12 from the cover 10 in a frontal direction 14 and one or more semi-lateral directions 18. The deployment portion 124 includes a frontal region 32 and a peripheral skirt 134. The frontal region 32 is generally perpendicular to the frontal direction 14. The peripheral skirt 134 is a variation of the peripheral skirt 34 described in connection with FIG. 1 and will be explained below.

The frontal region 32 includes a plurality of frontal portions 36 defined by frontal frangible seams 38. More specifically, a first, second, and third frontal portion 140, 142, 144 are defined in this implementation 111. The first frontal portion 140 includes a cut out portion 50 and is generally rectangular in shape. The second and third frontal portions 142, 144 are generally trapezoidal in shape and may include recesses from which the cut out portion 50 is taken.

In FIG. 2, the frontal frangible seams 38 are shown in a broken or open position. Accordingly, the frontal portions 36 are separated from each other to permit emergence of the cushion 12 between the frontal portions 36 in a frontal direction 14.

The deployment portion 124 also includes a junction 152 between the frontal region 32 and the peripheral skirt 134. The junction 152 includes junction seams 154 and hinged junctions 156. Breaking the junction seams 154 permits the frontal portions 36 to separate from the peripheral skirt 134 to permit the cushion 12 to emerge in a semi-lateral direction 18. In FIG. 2, the junction seams 154 are shown in an open or broken position.

The hinged junctions 156 permit the frontal portions 36 to rotate with respect to the peripheral skirt 34 in response to expansion of the cushion 12. As illustrated in FIG. 2, rotation of each of the frontal portions 36 has already commenced.

A hinged junction 156 connects one side of each of the frontal portions 36 to the peripheral skirt 134. When the cover 10 is in a stowed position, the remainder of the frontal portion 36 that contacts the junction 152 is connected to the peripheral skirt 134 using a junction seam 154. As illustrated, these junction seams 154 break in response to expansion of the cushion 12. A hinged junction 156 may attach to various locations on a particular frontal portion 36. As will be understood by those skilled in the art, the illustrated location of a hinged junction 156 relative to a particular frontal portion 36 is not limiting of the scope of this invention.

The peripheral skirt 134 of this implementation 111 is a solid peripheral skirt 134 because the skirt 134 has no skirt portions 60 or skirt seams 62 (shown in FIG. 1). Accordingly, in this implementation 111, the peripheral skirt 134 is designed not to "open" in response to emergence of the cushion 12.

In this implementation 111, the boundary 190 between the peripheral skirt 134 and the attachment portion 22 is a fixed boundary 194. Accordingly, the peripheral skirt 134 is designed not to separate from the attachment portion 22 in response to emergence of the cushion 12.

Figure 3:
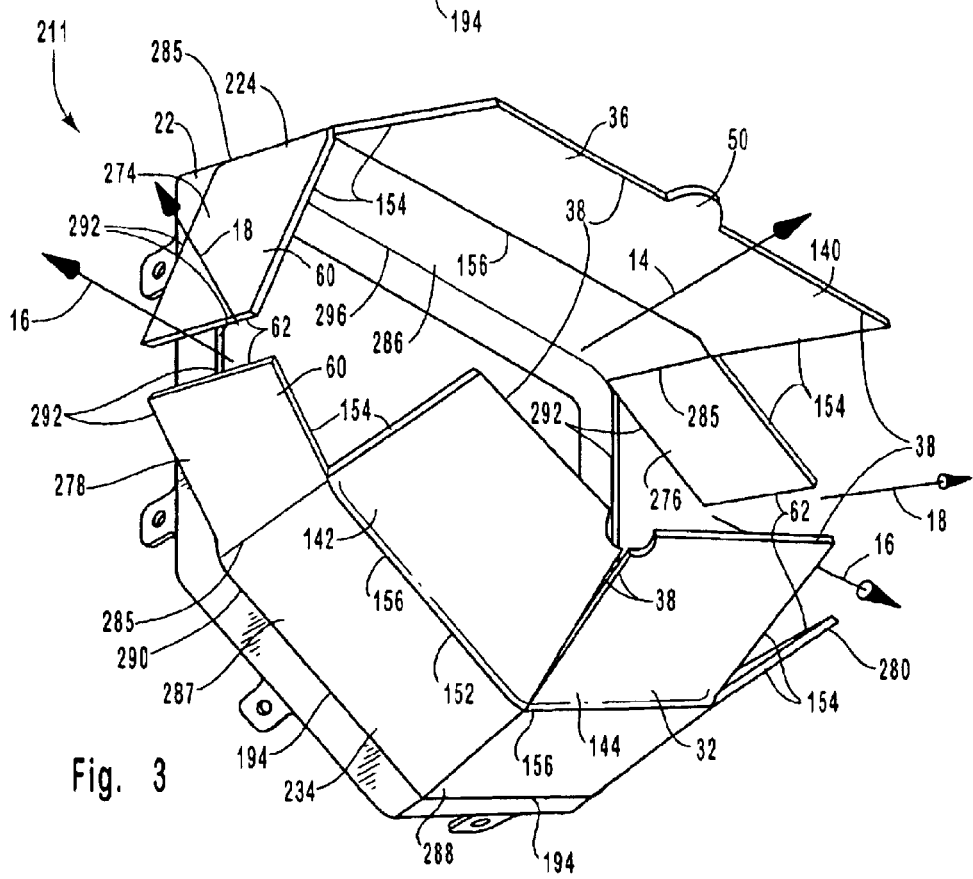
FIG. 3 is a perspective view of a second implementation of the first embodiment of the airbag cover in a partially deployed position.

Referring to FIG. 3, a perspective view of a second implementation 211 of the first embodiment of the airbag cover 10 in a partially deployed position is shown. The cushion 12 is omitted from FIG. 3 for clarity. This implementation 211 of the cover 10 opens to permit emergence of the cushion 12 in a frontal direction 14 and one or more lateral or semi-lateral directions 16, 18. An attachment portion 22 may be used to attach the cover 10 to a vehicle (not shown).

A deployment portion 224 of this implementation 211 includes a frontal region 32 and a peripheral skirt 234. The frontal region 32 is configured in the same manner as the frontal region 32 of the first implementation 111. Accordingly, frontal frangible seams 38 define a first, second, and third frontal portion 140, 142, 144 and may further define a cut out portion 50.

A junction 152 is disposed between the frontal region 32 and the peripheral skirt 234. The junction 152 of the second implementation 211 includes junction seams 154 and hinged junctions 156. The junction seams 154 and hinged junctions 156 are shaped and positioned similarly in both the first and second implementations 111, 211. The junction 152 permits each of the frontal portions 36 to separate from the peripheral skirt 234 and rotate away from the cushion 12 in response to emergence of the cushion 12.

Unlike the first implementation 111, the peripheral skirt 234 of the second implementation 211 includes a plurality of skirt portions 60 defined by skirt seams 62. As explained above, the skirt seams 62 break in response to emergence of the cushion 12 to permit the skirt portions 60 to separate from each other so that the cushion can deploy in one or more lateral directions 16. A junction seam 154 connects each of the skirt portions 60 to the frontal region 32. Each such junction seam 154 breaks in response to expansion of the cushion 12. In this implementation 211, the peripheral skirt 234 includes a first, second, third, and fourth skirt portion 274, 276, 278, 280. As shown in FIG. 3, each of the skirt portions 60 is generally rectangular in shape.

A skirt hinge 285 connects each of the skirt portions 60 to another portion of the peripheral skirt 234. Each skirt hinge 285 permits an associated skirt portion 60 to rotate away from the cushion 12 in response to emergence of the cushion 12.

The peripheral skirt 234 also includes a first, second, and third skirt segment 286, 287, 288. The skirt segments 286, 287, 288, in contrast to the skirt portions 60, do not separate from each other in response to emergence of the cushion 12. In this implementation 211, a hinged junction 156 connects each of the skirt segments 286, 287, 288 to a frontal portion 36. Also, a skirt hinge 285 connects each skirt portion 60 to one of the skirt segments 286, 287, 288.

The boundary 290 includes fixed boundaries 194, boundary seams 292, and hinged boundaries 296. In this implementation 211, when the cover 10 is in a stowed position, a boundary seam 292 connects each of the skirt portions 60 to the attachment portion 22. As illustrated in FIG. 3, the boundary seams 292 break in response to emergence of the cushion 12 to permit the skirt portions 60 to separate from the attachment portion 22 so that the cushion 12 may emerge in one or more lateral directions 16.

A hinged boundary 296 connects the first skirt segment 286 to the attachment portion 22. As a result, the first skirt segment 286 rotates with respect to the attachment portion 22 in response to expansion of the cushion 12. The first and second skirt portions 274, 276 and the first frontal portion 140, each of which is attached to the first skirt segment 286, and the first skirt segment 286 rotate away from the cushion 12 in response to emergence of the cushion 12.

As illustrated in FIG. 3, a fixed boundary 194 connects the second and third skirt segments 287, 288 to the attachment portion 22. As a result, the second and third skirt segments 287, 288 maintain a generally fixed position with respect to the attachment portion 22 during expansion of the cushion 12.

In an alternative implementation, a skirt seam 62 is disposed between the second and third skirt segments 287, 288. Also, a hinged boundary 296 connects each of the second and third skirt segments 287, 288 to the attachment portion 22. As such, the second and third skirt segments 287, 288 could be designated as skirt portions 60 and separate from each other and rotate away from the cushion 12 in response to expansion of the cushion 12.

In yet another implementation, a hinged boundary 296 could connect a skirt portion 60 to the attachment portion 22. Each such skirt portion 60 could be bounded by two skirt seams 62 and a junction seam 154 to allow the skirt seams 62 to rotate about the hinged boundary 296 in response to emergence of the cushion 12. Those skilled in the art will recognize that this and many similar variations come within the scope of this invention.

Figure 4:
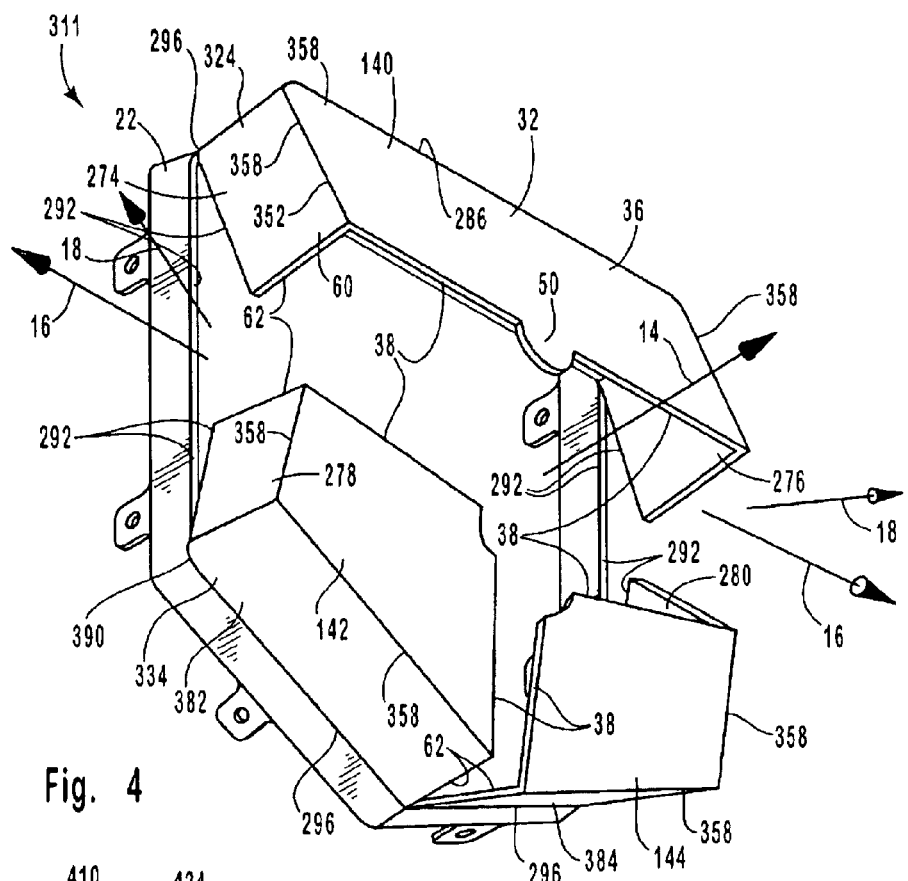
FIG. 4 is a perspective view of a third implementation of the first embodiment of the airbag cover in a partially deployed position.

With reference to FIG. 4, a perspective view of a third implementation 311 of the first embodiment of the airbag cover 10 in a partially deployed position is illustrated. As with FIGS. 2 and 3, the cushion 12 is omitted from FIG. 4 for clarity. This implementation 311 of the cover 10 opens to permit emergence of the cushion 12 in a frontal direction 14 and one or more lateral or semi-lateral directions 16, 18. The cover 10 includes an attachment portion 22 and a deployment portion 324.

The deployment portion 324 includes a frontal region 32 and a peripheral skirt 334. The frontal region 32 is configured in the same manner as the frontal region 32 of the first implementation 111. Accordingly, the frontal frangible seams 38 define a first, second, and third frontal portion 140, 142, 144 and may further define a cut out portion 50.

The junction 352 between the frontal region 32 and the peripheral skirt 334 is composed entirely of fixed junctions 358. The fixed junctions 358 maintain a generally fixed relationship between each of the frontal portions 36 and attached parts of the peripheral skirt 334 during expansion of the cushion 12.

The peripheral skirt 334 includes a plurality of skirt portions 60 defined by skirt seams 62. In particular, in this implementation 311, a first, second, third, fourth, fifth, and sixth skirt portion 274, 276, 278, 280, 382, 384 are defined. As shown, the skirt seams 62 are contiguous with frontal seams 38. A fixed junction 358 fixedly connects each skirt portion 60 to the adjacent frontal portion 36. This fixed relationship is maintained during emergence of the cushion 12. Accordingly, a generally fixed relationship is maintained between the second frontal portion 142, the third skirt portion 278, and the fifth skirt portion 382 during emergence of the cushion 12. Also, a generally fixed relationship is maintained between the third frontal portion 144, the fourth skirt portion 280, and the sixth skirt portion 384 during emergence of the cushion 12.

As in the second implementation 211, the peripheral skirt 334 includes a skirt segment 286. Again, the skirt segment 286 does not separate from adjacent parts of the peripheral skirt 334 during expansion of the cushion 12. A fixed junction 358 connects the skirt segment 286 to the first frontal portion 140. As such, a generally fixed relationship is maintained between the skirt segment 286, the first skirt portion 274, the second skirt portion 276, and the first frontal portion 140 during emergence of the cushion 12.

A boundary 390 is disposed between the peripheral skirt 334 and the attachment portion 22. The boundary 390 includes boundary seams 292 and hinged boundaries 296. When the cover 10 is in a stowed position, a boundary seam 292 connects the first, second, third, and fourth skirt portions 274, 276, 278, 280 to the attachment portion 22. These boundary seams 292 are shown in an open position in FIG. 4. The boundary seams 292 break in response to expansion of the cushion 12 to permit the cushion 12 to emerge between the attachment portion 22 and the first, second, third, and fourth skirt portions 274, 276, 278, 280 in lateral directions 16.

A hinged boundary 296 is disposed between the attachment portion 22 and the skirt segment 286, the fifth skirt portion 382, and the sixth skirt portion 384. As a consequence, in response to expansion of the cushion 12, the skirt segment 286, the fifth skirt portion 382, and the sixth skirt portion 384 will rotate away from the cushion 12. The skirt portions 60 and frontal portions 36 attached to these items 286, 382, 384 will also rotate in response to expansion of the cushion 12.

In an alternative implementation, a hinged boundary 296 connects the third skirt portion 278 to the attachment portion 22, and a boundary seam 292 connects the fifth skirt portion 382 to the attachment portion 22. Accordingly, in response to emergence of the cushion 12, the third skirt portion 278, fifth skirt portion 382, and second frontal portion 142 rotate about the hinged boundary 296 disposed between the third skirt portion 278 and the attachment portion 22. Other similar variations come within the scope of this invention.

Figure 5:
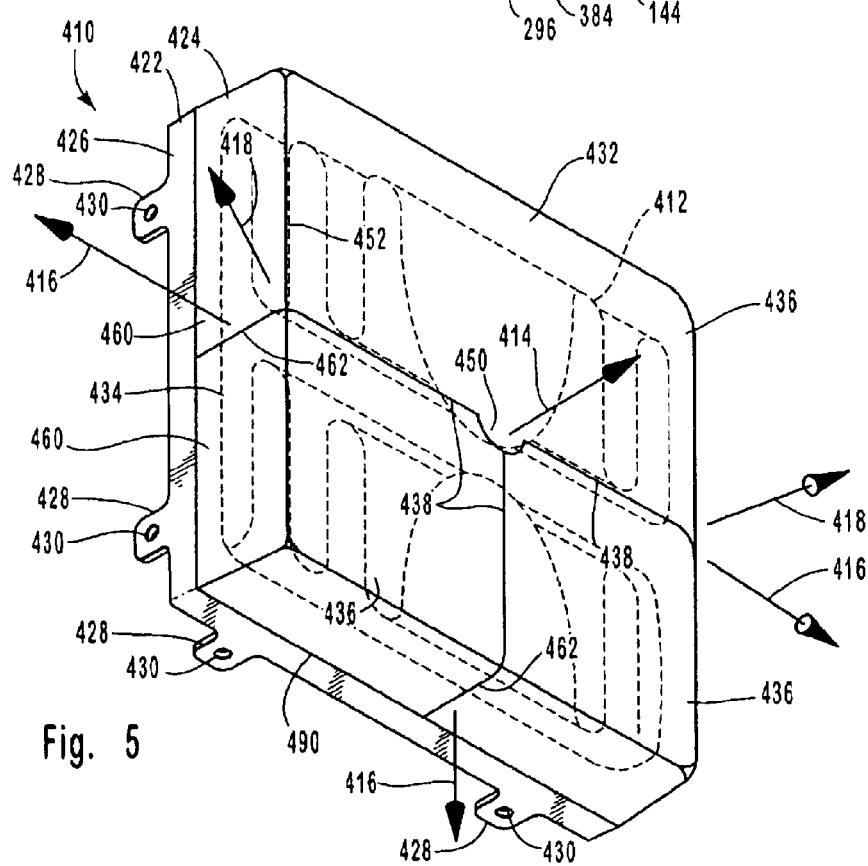
FIG. 5 is a perspective view of a second embodiment of an airbag cover in a stowed configuration with a folded cushion disposed within the cover.

Referring to FIG. 5, a perspective view of a second embodiment of an airbag cover 410 in a stowed configuration with a folded cushion 412 disposed within the cover 410 is illustrated. As illustrated, the airbag cover 410 has a generally square or rectangular shape. The cover 410, like the cover 10 of the first embodiment, may be used, for example, for a front impact airbag or as a knee airbag or inflatable curtain. As such, the cover 410 may be embodied in a number of different shapes.

A folded cushion 412 is shown in phantom, disposed within the cover 410. An inflator (not shown) is coupled to the folded cushion 412 to expel inflation gases into the folded cushion 412 and to induce expansion of the cushion 412 in response to a collision. As in the first embodiment, expansion of the cushion 412 forces the cover 410 to open along frangible seams. The cover 410 includes a frontal direction 414, lateral directions 416, and semi-lateral directions 418.

As in the first embodiment, the cover 410 has a vehicle attachment portion 422 designed to be attached to the interior of the vehicle, and a deployment portion 424 that opens to permit emergence of the folded cushion 412. The vehicle attachment portion 422 has a rim 426 disposed around the perimeter of the cover 410. A plurality of tabs 428 having holes 430 are disposed around the rim 426.

The deployment portion 424 includes a frontal region 432 and a peripheral skirt 434. The frontal region 432 is generally in the shape of a square or rectangle. The frontal region 432 generally faces a protected occupant of a vehicle when the cover 410 is disposed within a vehicle and, thus, is generally perpendicular to the frontal direction 414. The frontal region 432 is divided into a plurality of frontal portions 436 by frontal frangible seams 438. The frontal frangible seams 438 may be contiguous with each other. In response to expansion of the cushion 412, the frontal frangible seams 438 break to permit the frontal portions 436 to separate from each other. The frontal frangible seams 438 are formed in a T-shaped configuration. The T-shaped seam configuration can be oriented in various directions on the frontal region 432. Alternatively, the frontal seams 438 may be formed in other configurations that define three or more frontal portions 436, such as a Y-shape configuration. As in the first embodiment, the frontal region 432 optionally includes a cut out portion 450.

The deployment portion 424 also includes a junction 452 between the frontal region 432 and a peripheral skirt 434. As illustrated, the frontal region 432 and the peripheral skirt 434 meet at approximately a right angle. However, the junction 452 may include rounded or angled transitions from the frontal region 432 to the peripheral skirt 434. As in the first embodiment, the junction 452 may be comprised of junction seams, hinged junctions, and/or fixed junctions. The junction 452 will be discussed and illustrated further in connection with FIGS. 6–8.

As stated, the deployment portion 424 of the cover 410 also includes a peripheral skirt 434. The peripheral skirt 434 is attached to the perimeter of the frontal region 432 and extends between the frontal region 432 and the attachment portion 422. The peripheral skirt 434 is generally perpendicular to the frontal region 432. Alternatively, the peripheral skirt 434 is positioned at a different angle relative to the frontal region 432. For instance, the peripheral skirt 434 may be disposed at an angle such that the peripheral skirt 434 becomes wider as it nears the attachment portion 424.

In certain implementations, the peripheral skirt 434 is divided into a plurality of skirt portions 460 by skirt seams 462. The skirt seams 462 break in response to expansion of the cushion 412 to permit the skirt portions 460 to separate from each other. Separation of the skirt portions 460 permits the cushion 412 to emerge from the cover 410 in one or more lateral directions 416.

The cover 410 also includes a boundary 490 between the attachment portion 422 and the peripheral skirt 434. As in the first embodiment, the boundary 490 may be comprised of fixed boundaries, boundary seams, and/or hinged boundaries.

The second embodiment of the cover 410 may be implemented in a number of different ways. For instance, different configurations may be created by altering the length and position of junction seams, hinged junctions, or fixed junctions in the cover 410. Also, fixed boundaries, boundary seams, hinged boundaries, and skirt seams 462 may also be varied. The relative tear strength of the frontal frangible seams 438, skirt seams 462, and/or junction seams may be modified to provide for deployment of the cushion 412 in frontal, lateral, and/or semi-lateral directions 414, 416, 418. Specific, non-exhaustive implementations of the second embodiment are illustrated below in connection with FIGS. 6–8.

Figure 6:
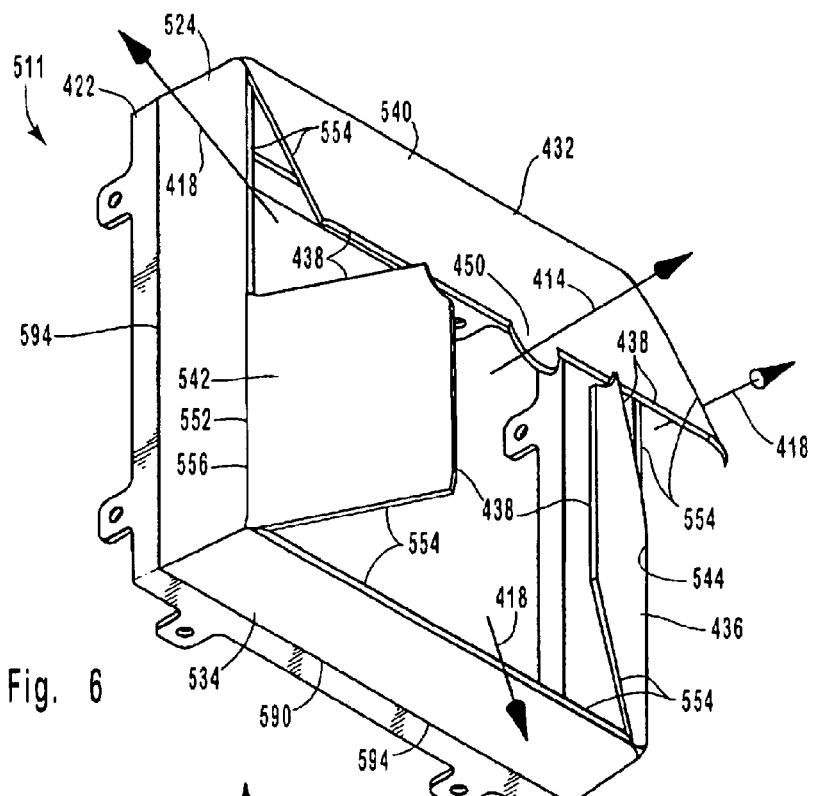
FIG. 6 is a perspective view of a first implementation of the second embodiment of the airbag cover in a partially deployed position.

With reference to FIG. 6, a perspective view of a first implementation 511 of the second embodiment of the airbag cover 410 in a partially deployed position is shown. The cushion 412 is omitted from FIG. 6 for clarity.

This implementation 511 of the cover 410 includes an attachment portion 422 and a deployment portion 524. The attachment portion 422 permits the cover 410 to be attached to a vehicle (not shown). The deployment portion 524 of the first implementation 511 opens to permit emergence of the cushion 412 from the cover 410 in a frontal direction 414 and one or more semi-lateral directions 418. The deployment portion 524 includes a frontal region 432 and a peripheral skirt 534.

The frontal region 432 includes a plurality of frontal portions 436 defined by frontal frangible seams 438. More specifically, a first, second, and third frontal portions 540, 542, 544 are defined in this implementation 511. The first frontal portion 540 includes a cut out portion 450 and is generally rectangular in shape. The second and third frontal portions 542, 544 are generally rectangular or square in shape and may include recesses from which the cut out portion 450 is taken.

In FIG. 6, the frontal frangible seams 438 are shown in a broken or open position. Accordingly, the frontal portions 436 are separated from each other to permit emergence of the cushion 412 between the frontal portions 436 in a frontal direction 414.

The junction 552 between the frontal region 432 and the peripheral skirt 534 of this implementation 511 may include junction seams 554 and hinged junctions 556. In FIG. 6, the junction seams 554 are shown in an open or broken position. The hinged junctions 556 permit the frontal portions 436 to rotate with respect to the peripheral skirt 434 in response to expansion of the cushion 412.

A hinged junction 556 connects one side of each of the frontal portions 436 to the peripheral skirt 534. When the cover 410 is in a stowed position, the remainder of the frontal portion 436 that contacts the junction 552 is connected to the peripheral skirt 534 using a junction seam 554. As illustrated, these junction seams 554 break in response to expansion of the cushion 412. A hinged junction 556 can attach to various locations on a particular frontal portion 436. As will be understood by those skilled in the art, the illustrated location of a hinged junction 556 relative to a particular frontal portion 436 is not limiting of the scope of this invention.

As in the first implementation 111 of the first embodiment, the peripheral skirt 534 of this implementation 511 is a solid peripheral skirt 534 because the skirt 534 has no skirt portions 460 or skirt seams 462 (shown in FIG. 5). Accordingly, in this implementation 511, the peripheral skirt 534 is designed not to "open" in response to emergence of the cushion 412.

A boundary 590 is disposed between the peripheral skirt 534 and the attachment portion 422. In this implementation 511, the boundary 590 is a fixed boundary 594. Accordingly, the peripheral skirt 534 is designed not to separate from the attachment portion 422 in response to emergence of the cushion 412.

Figure 7:
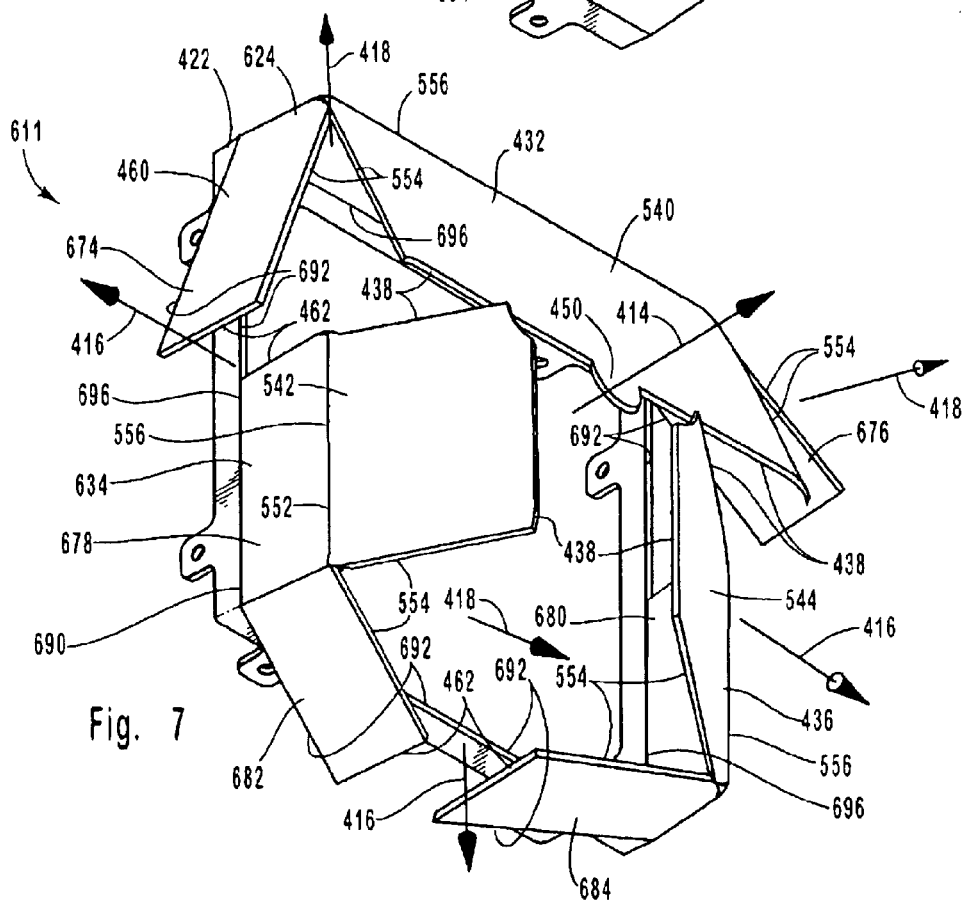
FIG. 7 is a perspective view of a second implementation of the second embodiment of the airbag cover in a partially deployed position.

Referring to FIG. 7, a perspective view of a second implementation 611 of the second embodiment of the airbag cover 410 in a partially deployed position is illustrated. An attachment portion 422 can be used to attach the cover 410 to a vehicle. The cushion 412 is omitted for clarity.

A deployment portion 624 opens to permit emergence of the cushion 412 in a frontal direction 414 and one or more lateral and semi-lateral directions 416, 418. The deployment portion 624 includes a frontal region 432 and the peripheral skirt 634. The frontal region 432 is configured in the same manner as the first implementation 511 and, accordingly, includes a first, second, and third frontal portion 540, 542, 544 and optionally includes a cut out portion 450 defined by frontal frangible seams 438.

A junction 552 is disposed between the frontal region 432 and the peripheral skirt 634. The junction 552 of the second implementation 611 includes junction seams 554 and hinged junctions 556. The junction seams 554 and hinged junctions 556 are shaped and positioned similarly in both the first and second implementations 511, 611. The junction 552 permits each of the frontal portions 436 to separate from the peripheral skirt 634 and rotate away from the cushion 412 in response to emergence of the cushion 412.

Unlike the first implementation 511, the peripheral skirt 634 of the second implementation 611 includes a plurality of skirt portions 460 defined by skirt seams 462. As explained above, the skirt seams 462 break in response to emergence of the cushion 412 to permit the skirt portions 460 to separate from each other to permit the cushion 412 to deploy in one or more lateral directions 416. A junction seam 554 connects each of the skirt portions 460 to the frontal region 432. Each such junction seam 554 breaks in response to expansion of the cushion 412. In this implementation 611, the peripheral skirt 634 includes a first, second, third, fourth, fifth, and sixth skirt portions 674, 676, 678, 680, 682, 684. As shown in FIG. 7, each of the skirt portions 460 is generally rectangular in shape.

A skirt hinge 685 connects each of the skirt portions 460 to another portion of the peripheral skirt 634. Each skirt hinge 685 permits an associated skirt portion 460 to rotate away from the cushion 412 in response to emergence of the cushion 412.

The peripheral skirt 634 also includes a skirt segment 686. The skirt segment 686, in contrast to the skirt portions 460, does not separate from another portion of the skirt 634 in response to emergence of the cushion 412. In this implementation 611, a hinged junction 556 connects the skirt segment 686 to the first frontal portion 540. A skirt hinge 685 connects the skirt segment 686 to the first and second skirt portions 674, 676.

The boundary 690 disposed between the attachment portion 422 and the peripheral skirt 634 comprises boundary seams 692 and hinged boundaries 696. In this implementation 611, when the cover 410 is in a stowed position, a boundary seam 692 connects the first, second, fifth, and sixth skirt portions 674, 676, 682, 684 to the attachment portion 422. As illustrated in FIG. 7, the boundary seams 692 break in response to emergence of the cushion 412 to permit these skirt portions 674, 676, 682, 684 to separate from the attachment portion 422 and permit the cushion 412 to emerge in one or more lateral directions 416.

A hinged boundary 696 connects the third and fourth skirt portions 678, 680 and the skirt segment 686 to the attachment portion 422. As a result, the third and fourth skirt portions 678, 680 and the skirt segment 686 rotate with respect to the attachment portion 422 in response to expansion of the cushion 412.

Figure 8:
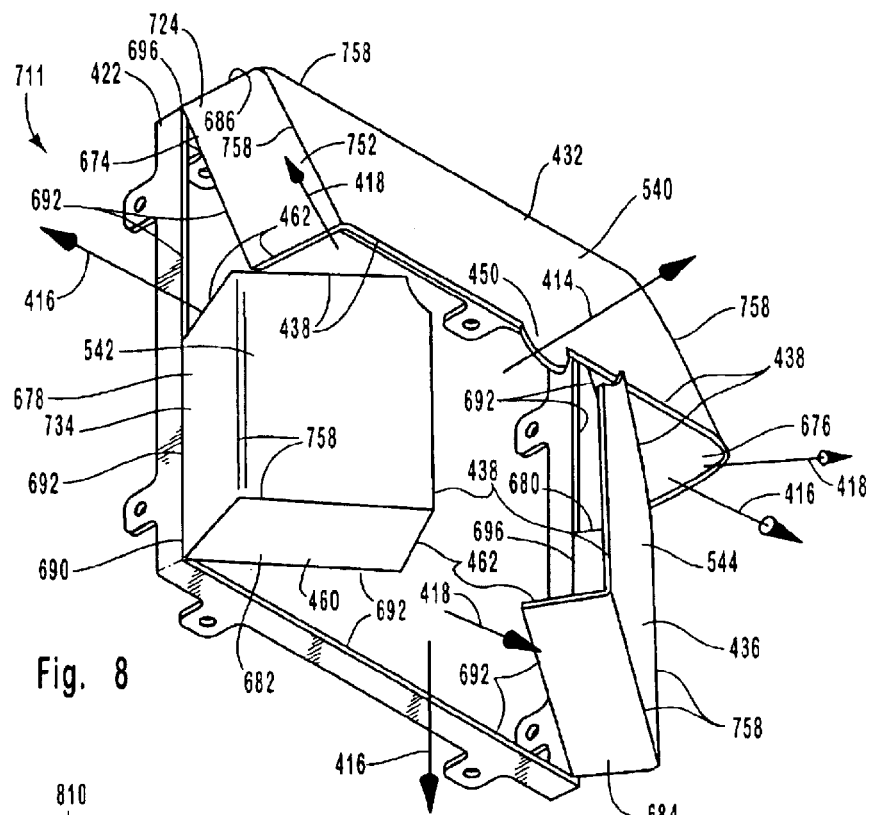
FIG. 8 is a perspective view of a third implementation of the second embodiment of the airbag cover in a partially deployed position.

With reference to FIG. 8, a perspective view of a third implementation 711 of the second embodiment of the airbag cover 410 in a partially deployed position is shown. As with FIGS. 6 and 7, the cushion 412 is omitted from FIG. 8 for clarity. The cover 410 includes an attachment portion 422 and a deployment portion 724.

The deployment portion 724 opens to permit emergence of the cushion 412 in a frontal direction 414 and one or more lateral and semi-lateral directions 416, 418. The deployment portion 724 includes a frontal region 432 and a peripheral skirt 734. The frontal region 432 is configured in the same manner as the first and second implementations 511, 611 and, accordingly, includes a first, second, and third frontal portion 540, 542, 544 and optionally includes a cut out portion 450 defined by frontal frangible seams 438.

In this implementation 711, the junction 752 is composed entirely of fixed junctions 758. The fixed junction 758 maintains a generally fixed relationship between each of the frontal portions 436 and attached parts of the peripheral skirt 734 during expansion of the cushion 412.

The peripheral skirt 734 includes a plurality of skirt portions 460 defined by skirt seams 462. In particular, in this implementation 711, a first, second, third, fourth, fifth, and sixth skirt portion 674, 676, 678, 680, 682, 684 are defined.

As shown, the skirt seams 462 are contiguous with the frontal seams 438. A fixed junction 758 fixedly connects each skirt portion 460 to the adjacent frontal portion 436. As such, this fixed relationship is maintained during emergence of the cushion 412. Accordingly, a generally fixed relationship is maintained between the second frontal portion 542, the third skirt portion 678, and the fifth skirt portion 682 during emergence of the cushion 412. Also, a generally fixed relationship is maintained between the third frontal portion 544, the fourth skirt portion 680, and the sixth skirt portion 684 during emergence of the cushion 412.

As in the second implementation 611, the peripheral skirt 734 includes a skirt segment 686 that does not separate from adjacent parts of the peripheral skirt 734 during expansion of the cushion 412. A fixed junction 758 connects the skirt segment 686 to the first frontal portion 540. A generally fixed relationship is maintained between the skirt segment 686, the first skirt portion 674, the second skirt portion 676, and the first frontal portion 540 during emergence of the cushion 412.

In this implementation 711, the boundary 690 between the peripheral skirt 734 and attachment portion 422 includes boundary seams 692 and hinged boundaries 696. When the cover 410 is in a stowed position, a boundary seam 692 connects the first, second, fifth, and sixth skirt portions 674, 676, 682, 684 to the attachment portion 422. These boundary seams 692 are shown in an open position in FIG. 8. The boundary seams 692 break in response to expansion of the cushion 412 to permit the cushion 412 to emerge between the attachment portion 422 and the first, second, fifth, and sixth skirt portions 674, 676, 682, 684 in a lateral direction 416.

A hinged boundary 696 connects the attachment portion 422 to the skirt segment 686, the third skirt portion 678, and the fourth skirt portion 680. As a consequence, in response to expansion of the cushion 412, the skirt segment 686, the third skirt portion 678, and the fourth skirt portion 680 will rotate away from the cushion 412. The skirt portions 460 and frontal portions 436 attached to these items, 678, 680, 686 will also rotate in response to expansion of the cushion 412.

In an alternative implementation, a hinged boundary 696 connects the fifth skirt portion 682 to the attachment portion 422, and a boundary seam 692 connects the third skirt portion 678 to the attachment portion 422. Accordingly, in response to emergence of the cushion 412, the third skirt portion 678, fifth skirt portion 682, and second frontal portion 542 rotate about the hinged boundary 696 that connects the fifth skirt portion 682 to the attachment portion 422. Other variations in placement of the hinged boundary 696 similarly come within the scope of this invention.

Figure 9:
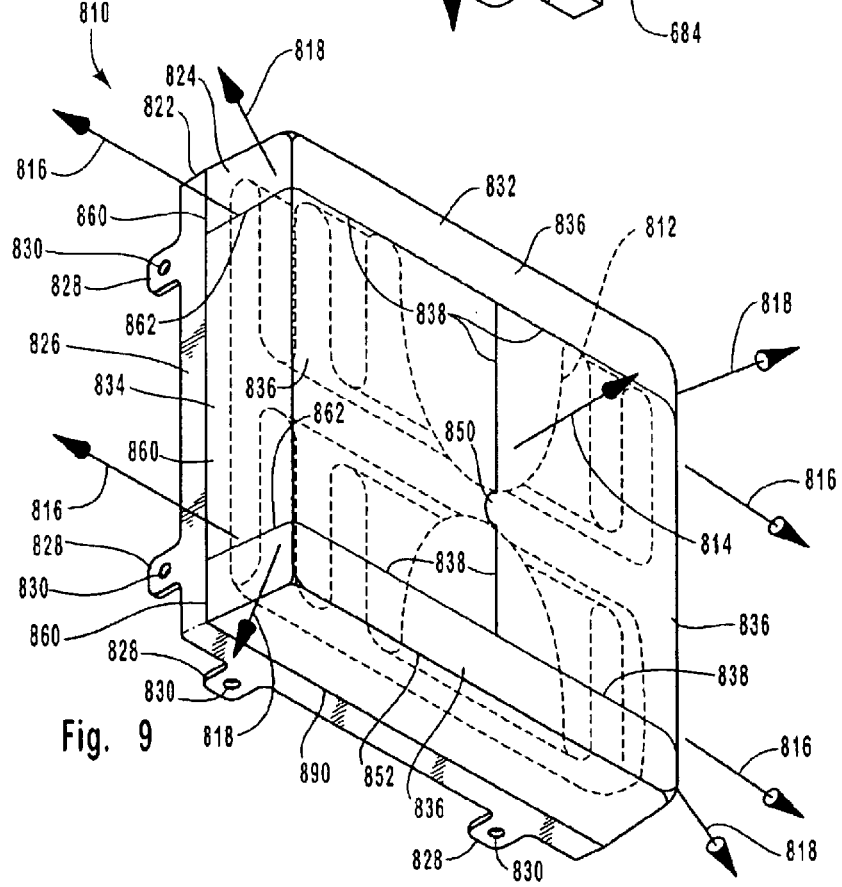
FIG. 9 is a perspective view of a third embodiment of an airbag cover in a stowed configuration with a folded cushion disposed within the cover.

Referring to FIG. 9, a perspective view of a third embodiment of an airbag cover 810 in a stowed configuration with a folded cushion 812 disposed within the cover 810 is shown. As illustrated, the airbag cover 810 has a generally square or rectangular shape. As in the first and second embodiments, the cover 810 of this embodiment is used, for example, for a front impact airbag designed to protect a head and torso of an occupant of a vehicle, such as a driver's side airbag or a passenger's side airbag. Alternatively, the cover 810 can be used for an airbag designed to protect a different part of the body of an occupant, such as a knee airbag or inflatable curtain. As such, the cover 810 may be embodied in a number of different shapes. For instance, the cover 810 could be formed in the shape of an elongated rectangle or a rounded disk.

A folded cushion 812 is shown in phantom, disposed within the cover 810. An inflator (not shown) is coupled to the folded cushion 812 to expel inflation gases into the folded cushion 812 and induce expansion of the cushion 812 in response to a collision. Expansion of the cushion 812 forces the cover 810 to open along frangible seams, which will be described below. The cover 810 includes a frontal direction 814, lateral directions 816, and semi-lateral directions 818.

The cover 810 has a vehicle attachment portion 822 designed to be attached to the interior of the vehicle, and a deployment portion 824 that opens to permit emergence of the folded cushion 812. As in the first and second embodiments, the vehicle attachment portion 822 has a rim 826 disposed around the perimeter of the cover 810. A plurality of tabs 828 having holes 830 are disposed around the rim 826.

The deployment portion 824 includes a frontal region 832 and a peripheral skirt 834. The frontal region 832 is generally in the shape of a rectangle or square. The frontal region 832 generally faces a protected occupant of a vehicle when the cover 810 is disposed within a vehicle and, thus, is generally perpendicular to the frontal direction 814. The frontal region 832 is divided into a plurality of frontal portions 836 by frontal frangible seams 838. In response to expansion of the cushion 812, the frontal frangible seams 838 break to permit the frontal portions 836 to separate from each other. The frontal frangible seams 838 are formed in an I-shaped configuration. The I-shaped seam configuration may be oriented in various directions on the frontal region 832. Alternatively, the frontal seams 838 may be formed in other configurations that define four or more frontal portions 836. As in the first and second embodiments, the frontal region 832 optionally includes a cut out portion 850 for placement of an emblem or other styling on approximately the center of the cover 810.

The deployment portion 824 also includes a junction 852 between the frontal region 832 and a peripheral skirt 834. As illustrated, the frontal region 832 and the peripheral skirt 834 meet at approximately a right angle. However, the junction 852 may include rounded or angled transitions from the frontal region 832 to the peripheral skirt 834. The junction 852 may be comprised of junction seams, hinged junctions, and/or fixed junctions. The junction 852 will be discussed and illustrated further in connection with FIGS. 10–12.

As stated, the deployment portion 824 of the cover 810 also includes a peripheral skirt 834. The peripheral skirt 834 is attached to the perimeter of the frontal region 832 and extends between the frontal region 832 and the attachment portion 822. The peripheral skirt 834 is generally perpendicular to the frontal region 832. Alternatively, the peripheral skirt 834 is disposed at a different angle relative to the frontal region 832. For instance, the peripheral skirt 834 may be disposed at an angle such that the peripheral skirt 834 becomes wider as it nears the deployment portion 824.

In certain implementation, the peripheral skirt 834 is divided into a plurality of skirt portions 860 by skirt seams 862. The skirt seams 862 break in response to expansion of the cushion 812 to permit the skirt portions 860 to separate from each other. Separation of the skirt portions 860 permits the cushion 812 to emerge from the cover 810 in one or more lateral directions 816.

The cover 810 also includes a boundary 890 between the attachment portion 822 and the peripheral skirt 834. The boundary 890 may be comprised of fixed boundaries, boundary seams, and/or hinged boundaries.

The third embodiment of the cover 810 may be implemented in a number of different ways. For instance, different configurations can be created by altering the length and position of junction seams, hinged junctions, or fixed junctions in the cover 810. Also, fixed boundaries, boundary seams, hinged boundaries, and skirt seams 862 may also be varied. The relative tear strength of the frontal frangible seams 838, skirt seams 862, and/or junction seams can be modified to provide for deployment of the cushion 812 in frontal, lateral, and/or semi-lateral directions 814, 816, 818. Specific, non-exhaustive implementations of the third embodiment are illustrated below in connection with FIGS. 10–12.

Figure 10:
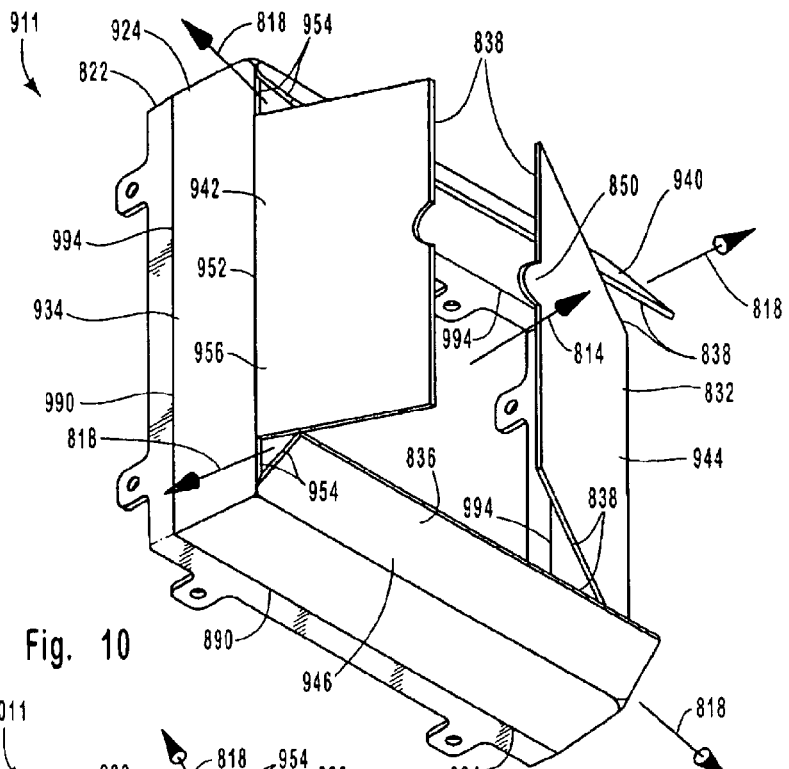
FIG. 10 is a perspective view of a first implementation of the third embodiment of the airbag cover in a partially deployed position.

With reference to FIG. 10, a perspective view of a first implementation 911 of the third embodiment of the airbag cover 810 in a partially deployed position is illustrated. The cushion 812 is omitted from FIG. 10 for clarity.

This implementation 911 of the cover 810 includes an attachment portion 822 and a deployment portion 924. The attachment portion 822 permits the cover 810 to be attached to a vehicle (not shown). The deployment portion 924 of the first implementation 911 permits emergence of the cushion 812 from the cover 810 in a frontal direction 814 and one or more semi-lateral directions 818. The deployment portion 924 includes a frontal region 832 and a peripheral skirt 934.

The frontal region 832 includes a plurality of frontal portions 836 defined by frontal frangible seams 838. More specifically, a first, second, third, and fourth frontal portion 940, 942, 944, 946 are defined in this implementation 911. The third frontal portion 944 includes a cut out portion 850 and is generally rectangular in shape. The first, second, and fourth frontal portions 940, 942, 946 are generally rectangular or square in shape, and the second frontal portion 942 may include a recess from which the cut out portion 850 is taken.

In FIG. 10, the frontal frangible seams 838 are shown in a broken or open position. Accordingly, the frontal portions 836 are separated from each other to permit emergence of the cushion 812 between the frontal portions 836 in a frontal direction 814.

The junction 952 between the frontal region 832 and the peripheral skirt 934 of this implementation 911 includes junction seams 954 and hinged junctions 956. Breaking the junction seams 954 permits the frontal portions 836 to separate from the peripheral skirt 934 to permit the cushion 812 to emerge in a semi-lateral direction 818. In FIG. 10, the junction seams 954 are shown in an open or broken position. The hinged junctions 956 permit the frontal portions 836 to rotate with respect to the peripheral skirt 934 in response to expansion of the cushion 812.

A hinged junction 956 connects one side of each of the frontal portions 836 to the peripheral skirt 934. When the cover 810 is in a stowed position, the remainder of the frontal portion 836 that contacts the junction 952 is connected to the peripheral skirt 534 using a junction seam 954. As illustrated, these junction seams 954 break in response to expansion of the cushion 812. A hinged junction 956 may attach to various locations on a particular frontal portion 836. As will be understood by those skilled in the art, the illustrated location of a hinged junction 956 relative to a particular frontal portion 836 is not limiting of the scope of this invention.

As in the first implementation 111 of the first embodiment, the peripheral skirt 934 of this implementation 911 is a solid peripheral skirt 934 because the skirt 934 has no skirt portions 860 or skirt seams 862 (shown in FIG. 9). Accordingly, in this implementation 911, the peripheral skirt 934 is designed not to "open" in response to emergence of the cushion 812.

A boundary 990 is disposed between the peripheral skirt 934 and the attachment portion 822. In this implementation 911, the boundary 990 is a fixed boundary 994. Accordingly, the peripheral skirt 934 is designed not to separate from the attachment portion 822 in response to emergence of the cushion 812.

Figure 11:
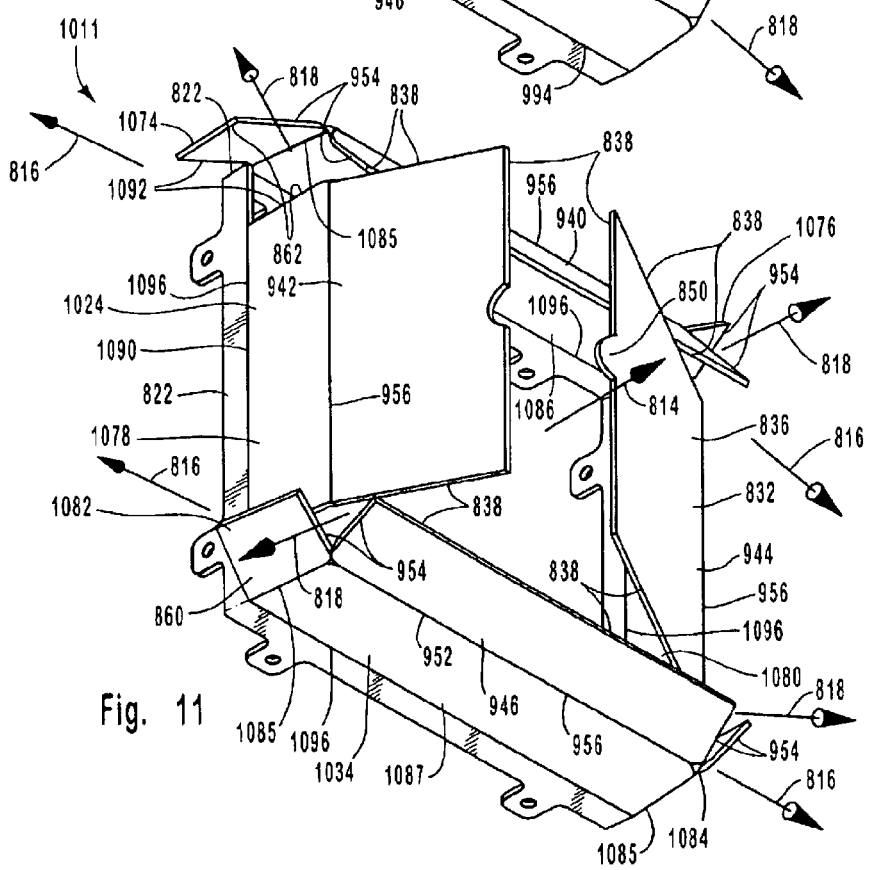
FIG. 11 is a perspective view of a second implementation of the third embodiment of the airbag cover in a partially deployed position.

Referring to FIG. 11, a perspective view of a second implementation 1011 of the third embodiment of the airbag cover 810 in a partially deployed position is shown. An attachment portion 822 can be used to attach the cover 810 to a vehicle. The cushion 812 is omitted for clarity.

A deployment portion 1024 opens to permit emergence of the cushion 812 in a frontal direction 814 and one or more lateral and semi-lateral directions 816, 818. The deployment portion 1024 of this implementation 1011 includes a frontal region 832 and a peripheral skirt 1034. The frontal region 832 is configured in the same manner as the first implementation 911 and, accordingly, includes a first, second, third, and fourth frontal portion 940, 942, 944, 946 and optionally includes a cut out portion 850 defined by frontal frangible seams 838.

As in the first implementation 911 of the third embodiment, a junction 952 is disposed between the frontal region 832 and the peripheral skirt 1034. The junction 952 of the second implementation 1011 includes junction seams 954 and hinged junctions 956. The junction seams 954 and hinged junctions 956 are shaped and positioned similarly in both the first and second implementations 911, 1011.

Unlike the first implementation 911, the peripheral skirt 1034 of the second implementation 1011 includes a plurality of skirt portions 860 defined by skirt seams 862. As explained above, the skirt seams 862 break in response to emergence of the cushion 812 to permit the skirt portions 860 to separate from each other to permit the cushion to deploy in one or more lateral directions 816, 818. A junction seam 954 connects each of the skirt portions 860 to the frontal region 832. Each such junction seam 954 breaks in response to expansion of the cushion 812. In this implementation 1011, the peripheral skirt 1034 includes a first, second, third, fourth, fifth, and sixth skirt portions 1074, 1076, 1078, 1080, 1082, 1084. As shown in FIG. 11, each of the skirt portions 860 is generally rectangular in shape.

A skirt hinge 1085 connects each of the skirt portions 860 to another portion of the peripheral skirt 1034. Each skirt hinge 1085 permits an associated skirt portion 860 to rotate away from the cushion 812 in response to emergence of the cushion 810.

The peripheral skirt 1034 also includes a first and second skirt segment 1086, 1087. The skirt segments 1086, 1087, in contrast to the skirt portions 860, do not separate from another portion of the skirt 1034 in response to emergence of the cushion 812. In this implementation 1011, a hinged junction 956 connects the first skirt segment 1086 to the first frontal portion 940. A skirt hinge 1085 connects the first skirt segment 1086 to the first and second skirt portions 1074, 1076. As illustrated in FIG. 11, the second skirt segment 1087 is similarly configured.

The boundary 1090 between the attachment portion 822 and the peripheral skirt 1034 comprises boundary seams 1092 and hinged boundaries 1096. The boundary seams 1092 break in response to expansion of the cushion 812. The hinged boundaries 1096 permit rotation of the attached portion of the skirt 1034 when the cushion 812 expands.

In this implementation 1011, when the cover 810 is in a stowed position, a boundary seam 1092 connects the first, second, fifth, and sixth skirt portions 1074, 1076, 1082, 1084 to the attachment portion 822. As illustrated in FIG. 11, the boundary seams 1092 break in response to emergence of the cushion 812 to permit these skirt portions 1074, 1076, 1082, 1084 to separate from the attachment portion 822 and permit the cushion 812 to emerge in one or more lateral directions 816.

A hinged boundary 1096 connects the third and fourth skirt segments 1078, 1080 to the attachment portion 822. As a result, the segments 1078, 1080 rotate with respect to the attachment portion 822 in response to expansion of the cushion 812.

Figure 12:
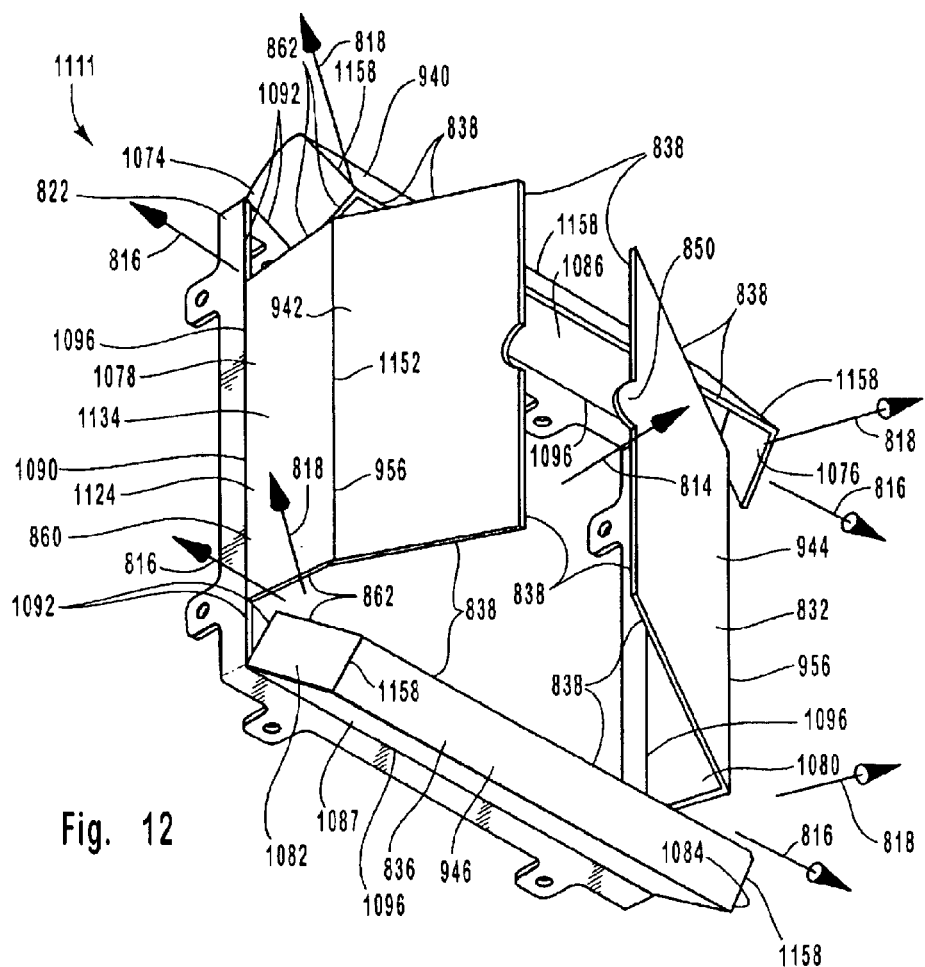
FIG. 12 is a perspective view of a third implementation of the third embodiment of the airbag cover in a partially deployed position.

With reference to FIG. 12, a perspective view of a third implementation 1111 of the third embodiment of the airbag cover 810 in a partially deployed position is shown. As with FIGS. 10 and 11, the cushion 812 is omitted from FIG. 12 for clarity. This implementation includes a frontal direction 814 and lateral directions 816. The cover 810 includes an attachment portion 822 and a deployment portion 1124.

The deployment portion 1124 opens to permit emergence of the cushion 812 in a frontal direction 814 and one or more lateral and semi-lateral directions 816, 818. The deployment portion 1124 includes a frontal region 832 and a peripheral skirt 1134. The frontal region 832 is configured in the same manner as the first and second implementations 911, 1011 and, accordingly, includes a first, second, and third frontal portion 940, 942, 944, 946 and optionally includes a cut out portion 850 defined by frontal frangible seams 838.

In this implementation 1111, the junction 1152 comprises hinged junctions 956 and fixed junctions 1158. The hinged junctions 956 allow an attached frontal portion 836 to rotate with respect to the peripheral skirt 1134. The fixed junction 1158 maintains a generally fixed relationship between each of the frontal portions 836 and attached parts of the peripheral skirt 1134 during expansion of the cushion 812.

The peripheral skirt 1134 includes a plurality of skirt portions 860 defined by skirt seams 862. In particular, in this implementation 1111, a first, second, third, fourth, fifth, and sixth skirt portion 1074, 1076, 1078, 1080, 1082, 1084 are defined. As shown, the skirt seams 862 are contiguous with the frontal seams 838. As such, this fixed junction 1158 fixedly connects the first, second, fifth, and sixth skirt portion 1074, 1076, 1082, 1084 to the adjacent frontal portion 836. This fixed relationship is maintained during emergence of the cushion 812. Accordingly, a generally fixed relationship is maintained between the first frontal portion 940, the first skirt portion 1074, and the second skirt portion 1076 during emergence of the cushion 812. Also, a generally fixed relationship is maintained between the fourth frontal portion 946, the fifth skirt portion 1082, and the sixth skirt portion 1184 during emergence of the cushion 812.

The peripheral skirt 1134 includes a first and a second skirt segment 1086, 1087. Again, the skirt segments 1086, 1087 do not separate from adjacent parts of the peripheral skirt 1134 during expansion of the cushion 812. A fixed junction 1158 connects the first skirt segment 1086 to the first frontal portion 940. A generally fixed relationship is maintained between the first skirt segment 1086, the first skirt portion 1074, the second skirt portion 1076, and the first frontal portion 940 during emergence of the cushion 812. A fixed junction 1158 connects the second skirt segment 1087 to the fourth frontal portion 946. As a result, a generally fixed relationship is maintained between the second skirt segment 1087, the fifth skirt portion 1082, the sixth skirt portion 1084, and the fourth frontal portion 946 during emergence of the cushion 812.

The boundary 1090 between the peripheral skirt 1134 and the attachment portion 822 includes boundary seams 1092 and hinged boundaries 1096. When the cover 810 is in a stowed position, a boundary seam 1092 connects the first, second, fifth, and sixth skirt portions 1074, 1076, 1082, 1084 to the attachment portion 822. These boundary seams 1092 are shown in an open position in FIG. 12. The boundary seams 1092 break in response to expansion of the cushion 812 to permit the cushion 812 to emerge between the attachment portion 822 and the first, second, fifth, and sixth skirt portions 1074, 1076, 1082, 1084 in a lateral direction 816.

A hinged boundary 1096 connects the attachment portion 822 to the first skirt segment 1086, the second skirt segment 1087, the third skirt portion 1078, and the fourth skirt portion 1080. As a consequence, in response to expansion of the cushion 812, the first skirt segment 1086, the second skirt segment 1087, the third skirt portion 1078, and the fourth skirt portion 1080 rotate away from the cushion 812. The skirt portions 860 and frontal portions 836 attached to these items 1078, 1080, 1086, 1087 will also rotate in response to expansion of the cushion 812.

In an alternative implementation, a hinged boundary 1096 connects the first skirt portion 1074 to the attachment portion 822, and a boundary seam 1092 connects the second skirt portion 1076 and the first skirt segment 1086 to the attachment portion 822. Accordingly, in response to emergence of the cushion 812, the first skirt portion 1074, second skirt portion 1076, first skirt segment 1086, and first frontal portion 940 rotate about the hinged boundary 1096 that connects the first skirt portion 1074 to the attachment portion 822. Other variations in placement of the hinged boundary 1096 similarly come within the scope of this invention.

A number of characteristics can be varied within the scope of this invention. For instance, the frangible seams, such as the frontal frangible seams 38, 438, 838, skirt seams 62, 462, 862, junction seams 154, 554, 954, and boundary seams 292, 692, 1092, may be embodied in a number of different ways. The frangible seams may be thinned regions, perforated regions, fissures across which the material of the cover has been attached together through sewing or other adhesive bonding, or any other configuration that provides a desired tear strength. The frangible seams may be regions of comparatively thin cover material formed through a method such as mechanical scoring, laser scoring, or ultrasonic scoring.

In one implementation, only non-perforated seams are used to avoid potential contamination of the cover 10, 410, 810 or inflator. Non perforated seams are seams that do not include any openings. As such the non-perforated seams limit the entry of foreign substances, such as a spilled soft drink, through a perforation.

Also, by varying the relative tear strength of the seams deployment of a cushion 12, 412, 812 may be modified. For instance, increasing the tear strength of the frontal frangible seams 38, 438, 838 relative to the junction seams 154, 554, 954 tends to favor deployment of the cushion 12, 412, 812 in a semi-lateral direction 18, 418, 818. Making the tear strength of the frontal frangible seams 38, 438, 838 approximately equal to the tear strength of the junction seams 154, 554, 954 provides for generally simultaneous deployment of a cushion in both a frontal direction 14, 414, 814 and a semi-lateral direction 18, 418, 818. Also, increasing the tear strength of the frontal frangible seams 38, 438, 838 relative to the skirt seams 62, 462, 862 or boundary seams 292, 692, 1092 tends to favor deployment of the cushion 12, 412, 812 in a lateral direction 16, 416, 816.

Also the hinges, such as hinged junctions 156, 556, 956, skirt hinges 285, 685, 1085, hinged boundaries 296, 696, 1096, may be embodied in a number of different ways. For example, the hinges may comprise thin portions of the cover 10, 410, 810. These thin portions, however, may be sufficiently strong to prevent tearing as a result of expansion of the cushion 12, 412, 812. Alternatively, the hinges may include mechanical hinges or pieces of flexible fabric attached to adjoining portions of the cover 10, 410, 810.

The orientation of the cover 10, 410, 810 as illustrated in FIGS. 1–12 does not indicate the orientation of the cover 10, 410, 810 when installed in a vehicle. The cover 10, 410, 810 may be positioned at various orientations when installed in a vehicle. For example, the T-shaped frontal frangible seam configuration of the first or second embodiment may be oriented upside down, right side up, or at another angle when viewed from the perspective of a protected occupant of a vehicle.

As explained above, in response to expansion of the cushion 12, 412, 812, each frontal portion 36, 436, 836 rotates about a hinged junction 156, 556, 956. As those skilled in the art will recognize, a hinged junction 156, 556, 956 may be positioned at various locations on a particular frontal portion 36, 436, 836 within the scope of this invention. Also, each skirt portion 60, 460, 860 may rotate about either a skirt hinge 285, 685, 1085 or a hinged boundary 296, 696, 1096 in response to expansion of the cushion. Similarly, those skilled in the art will recognize that with respect to a particular skirt portion 60, 460, 860, either a skirt hinge or a hinged boundary 296, 696, 1096 may be positioned at various locations on the skirt portion within the scope of this invention. Also, a skirt portion 60, 460, 860 may rotate about a hinged junction 156, 556, 956.

The covers and associated methods of the present invention provide a significant advancement in airbag design. By allowing inflatable cushions to inflate to cover a larger area, the covers of the present invention may provide enhanced protection for occupants disposed outside their nominal positions within the vehicle. Furthermore, through the use of mass distribution and momentum redirection, inflatable cushions may decrease the likelihood of injury as a result of impact of the vehicle occupant with the cushion. Thus, the overall effectiveness of airbags may be enhanced through the use of the covers and associated methods of the invention.

The present invention may be embodied in other specific forms without departing from its scope or essential characteristics. The described embodiments are to be considered in all respects only illustrative, not restrictive. The scope of the invention is, therefore, indicated by the appended claims rather than by the foregoing description. All changes that come within the meaning and range of equivalency of the claims are to be embraced within their scope.

What is claimed is:

1. A cover for covering a compacted inflatable cushion of an airbag, the cover comprising:
   a frontal region;
   at least three frontal portions within the frontal region defined by frangible frontal seams, wherein the frontal portions separate from each other in response to expansion of a compacted inflatable cushion to permit emergence of the cushion between the frontal portions in a frontal direction;
   a peripheral skirt attached to the frontal portion;
   a vehicle attachment portion attached to the peripheral skirt; and
   a plurality of skirt portions within the peripheral skirt defined by frangible skirt seams, wherein the skirt portions separate from each other in response to the expansion of the cushion to permit emergence of the cushion between the skirt portions in a lateral direction regardless of whether the frontal portions separate from each other in response to the expansion of the cushion, and wherein a boundary seam is disposed between at least one of the skirt portions and the vehicle attachment portion.

2. The cover as defined in claim 1, wherein a tear strength of the frontal and skirt seams is selected to permit substantially simultaneous tearing of the frontal and skirt seams in response to expansion of the cushion.

3. The cover as defined in claim 2, wherein a tear strength of the frontal seams is substantially equal to a tear strength of the skirt seams.

4. The cover as defined in claim 1, wherein a tear strength of the frontal and skirt seams is selected to permit the skirt seams to tear prior to tearing of the frontal seams in response to expansion of the cushion.

5. The cover as defined in claim 4, wherein a tear strength of the skirt seams is lower than a tear strength of the frontal seams.

6. The cover as defined in claim 1, wherein the frontal region is divided into three frontal portions by the frontal seams.

7. The cover as defined in claim 6, wherein the frontal seams define a substantially T-shaped seam configuration.

8. The cover as defined in claim 1, wherein the frontal region is divided into four frontal portions by the frontal seams.

9. The cover as defined in claim 8, wherein the frontal seams define a substantially I-shaped seam configuration.

10. The cover as defined in claim 1, further comprising at least one frangible junction seam disposed between the frontal region and the peripheral skirt.

11. The cover as defined in claim 1, wherein the frontal seams comprise non-perforated seams.

12. A cover for covering a compacted inflatable cushion of an airbag, the cover comprising:
    a frontal region;
    at least three frontal portions within the frontal region defined by non-perforated frangible frontal seams, wherein the frontal portions separate from each other in response to expansion of a compacted inflatable cushion to permit emergence of the cushion between the frontal portions in a frontal direction;
    a peripheral skirt attached to the frontal portion;
    a vehicle attachment portion attached to the peripheral skirt; and
    a plurality of skirt portions within the peripheral skirt defined by non-perforated frangible skirt seams, wherein the skirt portions separate from each other in response to the expansion of the cushion to permit emergence of the cushion between the skirt portions in a lateral direction regardless of whether the frontal portions separate from each other in response to the expansion of the cushion, and wherein a boundary seam is disposed between at least one of the skirt portions and the vehicle attachment portion.

13. The cover as defined in claim 12, wherein a tear strength of the frontal and skirt seams is selected to permit substantially simultaneous tearing of the frontal and skirt seams in response to expansion of the cushion.

14. The cover as defined in claim 12, wherein a tear strength of the frontal and skirt seams is selected to permit the skirt seams to tear prior to tearing of the frontal seams in response to expansion of the cushion.

15. The cover as defined in claim 12, wherein each of the skirt seams is contiguous with one of the frontal seams.

16. The cover as defined in claim 12, further comprising at least one junction seam disposed between the frontal region and the peripheral skirt.

17. An airbag system comprising:
    a compacted airbag; and
    a cover comprising a frontal region divided into at least three frontal portions by frangible frontal seams, a peripheral skirt divided into a plurality of skirt portions by frangible skirt seams, and a vehicle attachment portion attached to the peripheral skirt, wherein the frontal portions separate from each other in response to expansion of a compacted inflatable cushion to permit emergence of the cushion between the frontal portions in a frontal direction, and wherein the skirt portions separate from each other in response to the expansion of the cushion to permit emergence of the cushion between the skirt portions in a lateral direction regardless of whether the frontal portions separate from each other in response to the expansion of the cushion, and wherein a boundary seam is disposed between at least one of the skirt portions and the vehicle attachment portion.

18. The airbag system as defined in claim 17, wherein a tear strength of the frontal and skirt seams is selected to permit substantially simultaneous tearing of the frontal and skirt seams in response to expansion of the cushion.

19. The airbag system as defined in claim 17, wherein a tear strength of the frontal and skirt seams is selected to permit the skirt seams to tear prior to tearing of the frontal seams in response to expansion of the cushion.

20. The airbag system as defined in claim 17, wherein the frontal region is divided into three frontal portions by the frontal seams.

21. The airbag system as defined in claim 17, wherein the frontal region is divided into four frontal portions by the frontal seams.

22. The airbag system as defined in claim 17, further comprising at least one frangible junction seam disposed between the frontal region and the peripheral skirt.

* * * * *